US005666408A

United States Patent [19]

Lao

[11] Patent Number: 5,666,408
[45] Date of Patent: Sep. 9, 1997

[54] DUAL-LINE TELEPHONE JACK ADAPTER AND CABLE COUPLER

[76] Inventor: Kenneth Q. Lao, 650 Glen Ave., Westfield, N.J. 07090

[21] Appl. No.: 555,843

[22] Filed: Nov. 13, 1995

[51] Int. Cl.$^6$ ............................................. H04M 1/00
[52] U.S. Cl. ........................... 379/442; 439/638; 439/676
[58] Field of Search ................................. 379/442, 438, 379/327, 397, 332, 437, 451; 439/638, 628, 653, 676, 639, 646, 502

[56] References Cited

U.S. PATENT DOCUMENTS

| 4,295,702 | 10/1981 | Snyder | 379/442 |
| 4,362,905 | 12/1982 | Ismail | 379/442 |
| 4,444,451 | 4/1984 | Myers | 439/638 |
| 4,651,340 | 3/1987 | Marson | 379/327 |
| 5,328,390 | 7/1994 | Johnston | 439/638 |

*Primary Examiner*—Dwayne Bost
*Assistant Examiner*—Keith Ferguson

[57] ABSTRACT

A 4-pin telephone jack adapter which alters the pin configuration of a 4-pin telephone jack such that the phone line connected to the two outer pins of the jack is connected to the two inner pins of the adapter and be accessible to a one-line telephone set. The 4-pin telephone jack adapter can have two receptacle one of which alters the pin configuration of a 4-pin telephone jack while the other has the same pin configuration. With such an adapter, two one-line telephone sets can separately access to two phone lines connected to a 4-pin telephone jack. The same pin connection can be applied to a telephone cable coupler and a telephone extension cable.

16 Claims, 11 Drawing Sheets

DUAL-LINE TELEPHONE JACK ADAPTER AND CABLE COUPLER

BACKGROUND OF THE INVENTION

The present invention is related to a phone jack coupler which electrically connects one or more telephone sets to a phone jack providing the hookup for two different telephone lines.

Most households have only one telephone line. The line is first brought in by the phone company to a terminal box outside the house and then brought into the house and wired to a desired number of phone jacks distributed in various rooms throughout the house. The phone jacks and the interconnecting cables are very likely installed altogether when the house is built or renovated. The interconnection is such that the pin configuration in all the phone jacks is the same, so that a telephone set can be hooked up to the phone line by plugging into any one of the phone jacks with a telephone cable.

In general, a phone jack has four exposed pins seated in a row in its receiving end, to provide electrical contact to the exposed pins on the phone cable plug. Currently, a regular one-line telephone set uses only two wires to receive and transmit voice and ringing signals. Thus, only two of the four pins on the phone jack are actually needed to connect a regular phone set to a phone line. Conventionally, the two inner (center) pins of a phone jack and the corresponding pins on the phone plug are used for transmitting signals to and from a regular one-line phone set. Electrically, the two side pins are either opened or each of them is connected to the adjacent inner pin. For use in one-line hookup, a phone cable can have four wires or two wires.

As the use of modems and facsimile machines becomes increasingly common in the ordinary household, many houses are hooked up with two telephone lines. When a household requests for an additional phone line, the phone company usually adds the new line (line 2) to the same terminal box so that the two side or outer pins of the phone jack carry the signals for line 2 while the two inner pins carry the signals the original line (line 1). By doing so, the two telephone lines (line 1 and line 2) are accessible from any of the original installed phone jacks in the house without rewiring the house's interior. However, if one hook up a regular telephone set to a phone jack, only line 1 can be accessed. To use line 2, one could hook up a two-line telephone set and choose the "line 2" setting on the set. Alternatively, one could change the wiring behind the phone jack, or switch the wires in a phone cable by cutting the cable and reconnect the wires differently to allow signals from line 2 to reach a regular one-line phone set. It should be noted that, after a cable or a phone jack is altered, it can no longer be used to hook up a regular phone set to line 1.

It is desirable to provide a dual-line phone jack coupler so that a regular telephone set can be hooked up to line 2 without changing the interconnection behind a phone jack, or cutting up a cable to reconnect the Wire. Moreover, it is desirable to have a coupler that comprises two receiving ends, or receptacles, each provides connection to a different telephone line.

SUMMARY OF THE INVENTION

The present invention concerns with a phone jack adapter which alters the pin connection in a 4-pin phone jack. The invention has a number of embodiments: 1) a one-to-one coupler comprising two phone receptacles for receiving two telephone cable plugs; 2) a one-to-one adapter comprising one phone receptacle and one phone plug; 3) a one-to-two coupler comprising one receptacle on one end and two receptacles on the other ends; 4) a one-to-two adapter comprising two receptacles and one plug and 5) an extension cable comprising one plug on one end of the cable and one or more receptacles on the other end. The receptacle or the phone plug on the adapters and couplers, according to the present invention, can have two exposed pins or four exposed pins. These embodiments can be understood by reading the following description and the accompanying drawing figures.

Conventionally, the two inner pins of a regular 4-pin phone jack are used for carrying the telephone signals if only one phone line (line 1) is hooked up. The side pins are used for carrying the signals of another line (line 2) if two different phone lines are hooked up. However, when a regular (one-line) telephone set is plugged into a four-pin phone jack, the set is connected to line 1. With the phone jack adapter, according to the present invention, a regular telephone set can be connected to line 2 when it is plugged in the same 4-pin phone jack, without changing the wiring in the phone jack.

Another embodiment of the present invention is a one-to-two adapter which comprises a plug for plugging into a regular four-pin telephone jack and two receptacles for connecting two telephone sets. One receptacle switches the lines from line 1 to line 2 and vice versa, while the other receptacle does not alter the pin configuration of the phone jack. Thus, this one-to-two adapter can be used to connect two regular telephone sets separately to line 1 and line 2.

The function of the couplers is similar to that of the adapters, except that a coupler comprises another receptacle for receiving a telephone cable plug, in lieu of a phone plug on an adapter. The telephone extension cable, according to the present invention, is similar to the adapter, except that the plug and the receptacle are electrically connected by a two or four-wire telephone cable instead of a shorter connecting body on an adapter.

An objective of the present invention is to provide a telephone adapting device for switching the connection of two phone lines wired to a regular 4-pin telephone jack or carded by a regular 4-pin telephone cable. The switching is between line 1 and line 2.

Another objective of the present invention is to provide a telephone adapting device for providing separate connection to two phone lines wired to a regular 4-pin telephone jack or carried by a regular 4-pin telephone cable.

DETAILED DESCRIPTION OF THE INVENTION

Figure 1A:
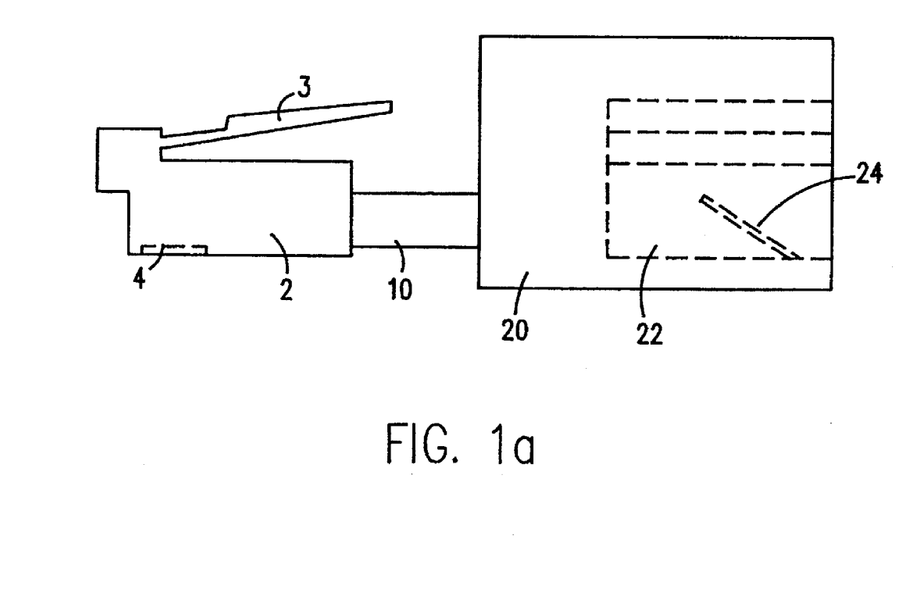
FIG. 1 illustrates the side view and the rear view of a one-to-one telephone jack adapter.
Figure 1B:
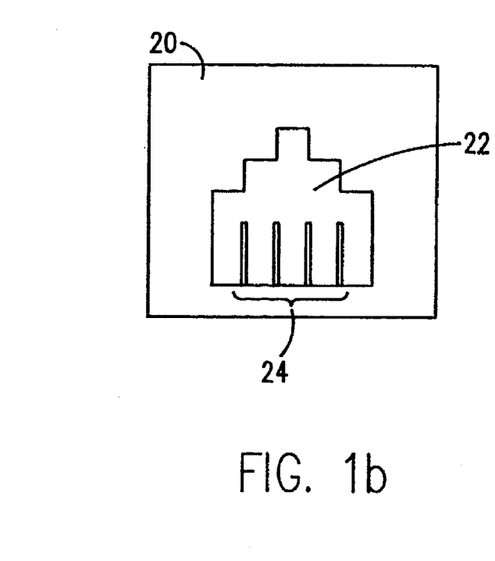
Figure 2:
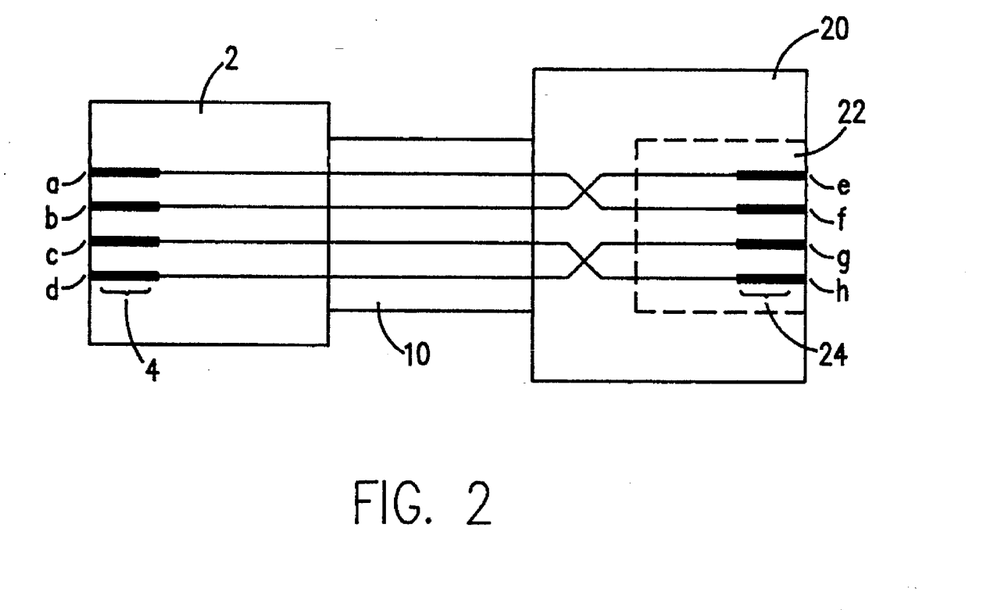
FIG. 2 illustrates the pin connection in the one-to-one adapter of FIG. 1.

FIG. 1(a) shows the side view of the one-to-one telephone jack adapter, according to the present invention, which alters the pins configuration in a four-pin telephone jack. As shown in FIG. 1(a), numeral 2 denotes a plug for plugging into a regular telephone jack comprising four exposed pins therewithin. On the plug body, a flexible latch 3 is used to secure the plug to the telephone jack; numeral 4 denotes the four exposed pins seated on one side of plug opposite to the latch 3 for providing electrical contact between the adapter and the telephone jack. Numeral 20 denotes a receptacle which has an opening 22 for receiving a regular telephone-cable plug; numeral 24 denotes four exposed pins seated inside the opening 22 for providing electrical contact between the adapter and the telephone cable plug. The plug 2 and the receptacle 20 is connected by a connecting body 10. The connecting body 10 can be short or long, solid or flexible. The connecting body 10 comprises at least four wires (not shown) for electrically connecting the pins 4 on the plug 2 and the pins 24 in the receptacle 24. The interconnection between the pins is illustrated in FIG. 2. FIG. 1(b) illustrates the rear view of the one-to-one telephone jack adapter showing the opening 22 and the pins 24 of the receptacle 20.

FIG. 2 illustrates the pin connection in the one-to-one telephone jack adapter, according to the present invention. In FIG. 2, the positions of the pins 4 are labeled (a,b,c,d), matching the four pin positions of a regular 4-pin telephone jack. The positions of pins 24 are labeled (e,f,g,h), matching the four pin positions of a regular 4-pin telephone cable plug. As shown, the two outer pins (a,d) of the plug are electrically connected to the two inner pins (f,g) of the receptacle; the two inner pins (b,c) of the plug are electrically connected to the two outer pins (e,h) of the receptacle. When the adapter is plugged into a phone jack which carries line 1 signals on its two inner pins and line 2 on its two outer pins, the inner pins (f,g) of the receptacle will carry line 2 signals while the outer pins (e,h) carry line 1 signals. Thus, when a regular one-line telephone set is plugged into a phone jack through the adapter, the phone set is connected to line 2.

Figure 3:
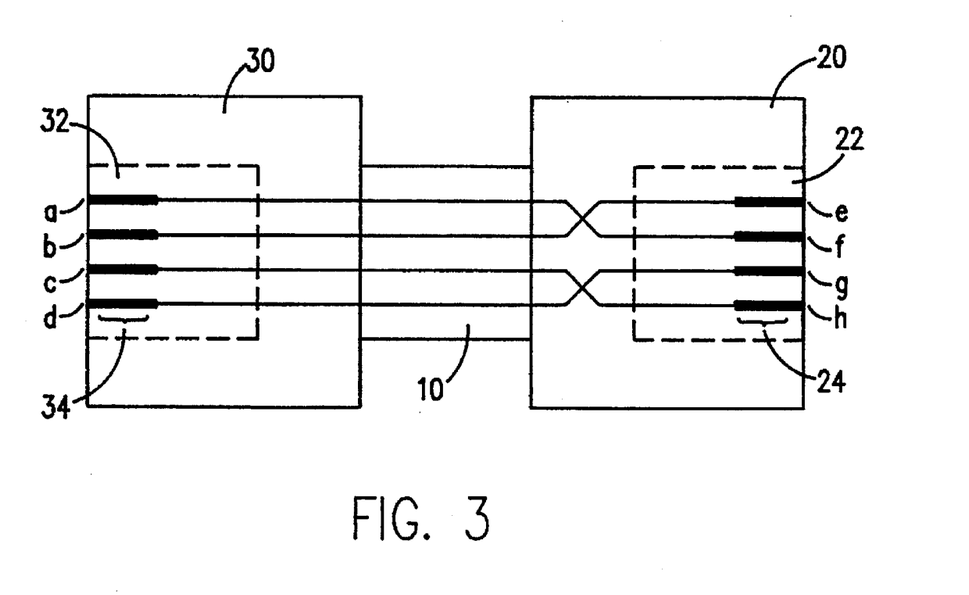
FIG. 3 illustrates the pin connection in a one-to-one telephone cable coupler.

FIG. 3 illustrates the pin connection in the one-to-one telephone cable coupler, according to the present invention, which comprises two receptacles for receiving regular telephone cable plugs. As shown, the four pins 34 in the opening 32 on the receptacle 30 are labeled (a,b,c,d) while the four pins 24 in the opening 22 on the receptacle 20 are labeled (e,f,g,h). The four pins on each receptacle match the four pin positions of a regular 4-pin telephone cable plug. Similar to the adapter illustrated in FIG. 2, outer pins (a,d) are connected to inner pins (f,g) while inner pins (c,d) are connected to outer pins (e,h).

Figure 4:
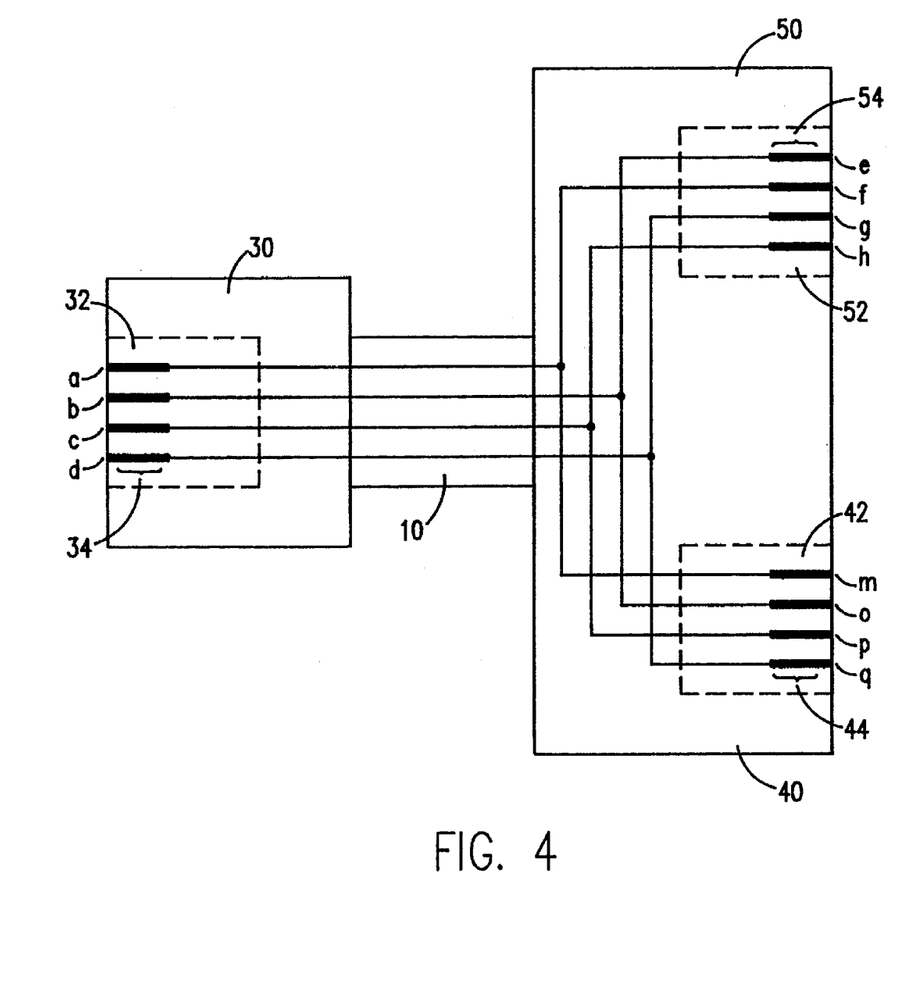
FIG. 4 illustrates the pin connection in a one-to-two telephone cable coupler.

FIG. 4 illustrates the pin connection in the one-to-two telephone cable coupler, according the present invention, which comprises three receptacles each-for receiving a regular telephone cable plug. As shown, the four pins 34 in the opening 32 on the receptacle 30 are labeled (a,b,c,d), the four pins 44 in the opening 42 on the receptacle 40 are labeled (m,o,p,q), and the four pins 54 in the opening 52 on receptacle 50 are labeled (e,f,g,h). The receptacles 40 and 50 can be constructed on a solid body as shown in FIG. 4 or they be connected by a connecting body. The pin connection between receptacle 30 and receptacle 40 is straight-through such that outer pins (a,d) are electrically connected to outer pins (m,q) while inner pins (b,c) are electrically connected to inner pins (o,p). The pin connection between receptacles 30 and 50 are the same as that illustrated in FIG. 3.

Figure 5:
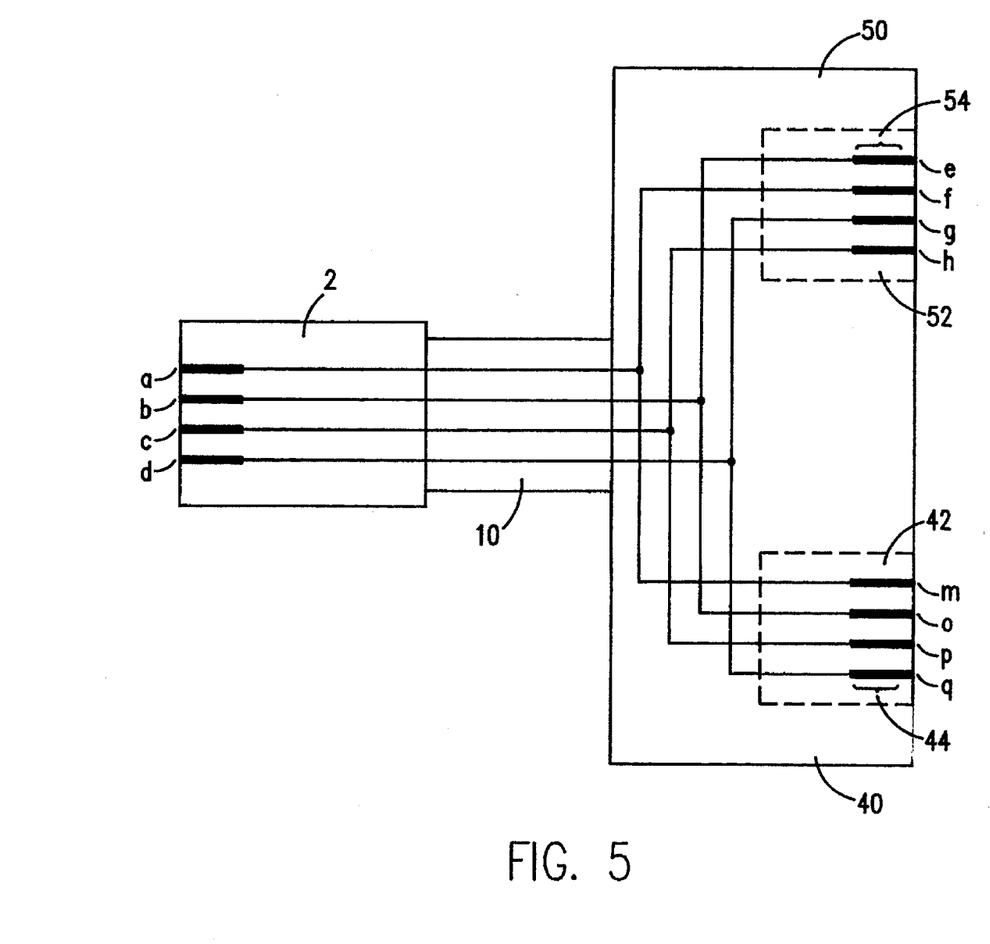
FIG. 5 illustrates the pin connection in a one-to-two telephone jack adapter.

FIG. 5 illustrates the pin connection in the one-to-two telephone jack adapter, according to the present invention, which comprises a plug for plugging into a regular telephone jack, and two receptacles for receiving regular telephone cable plugs. As shown in FIG. 5 the coupler has one plug 2 with four pins labeled by (a,b,c,d). The receptacles 40, 50 in FIG. 5 are identical to the receptacles 40 and 50 in FIG. 4. The interconnection of pins are identical to that illustrated in FIG. 4.

Figure 6:
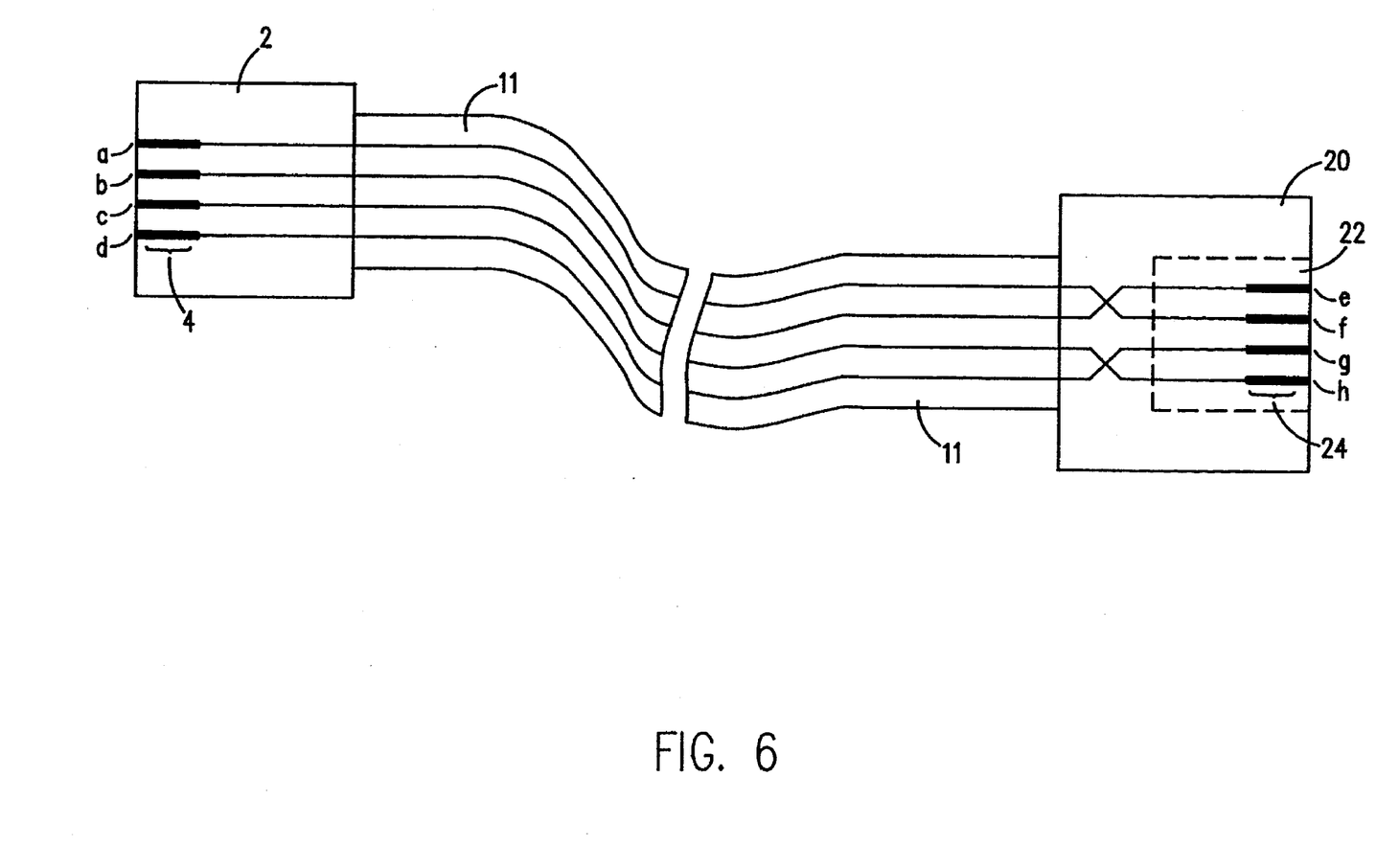
FIG. 6 illustrates the pin connection in a one-to-one telephone extension cable.

FIG. 6 illustrates the pin connection in the one-to-one telephone extension cable, according to the present invention, which is functionally similar to the one-to-one adapter of FIG. 1 except that the connecting body 10 on the one-to-one adapter is replaced by a telephone cable 11 comprising four wires. The pin connection is identical to that in the one-to-one adapter as shown in FIG. 2.

Figure 7:
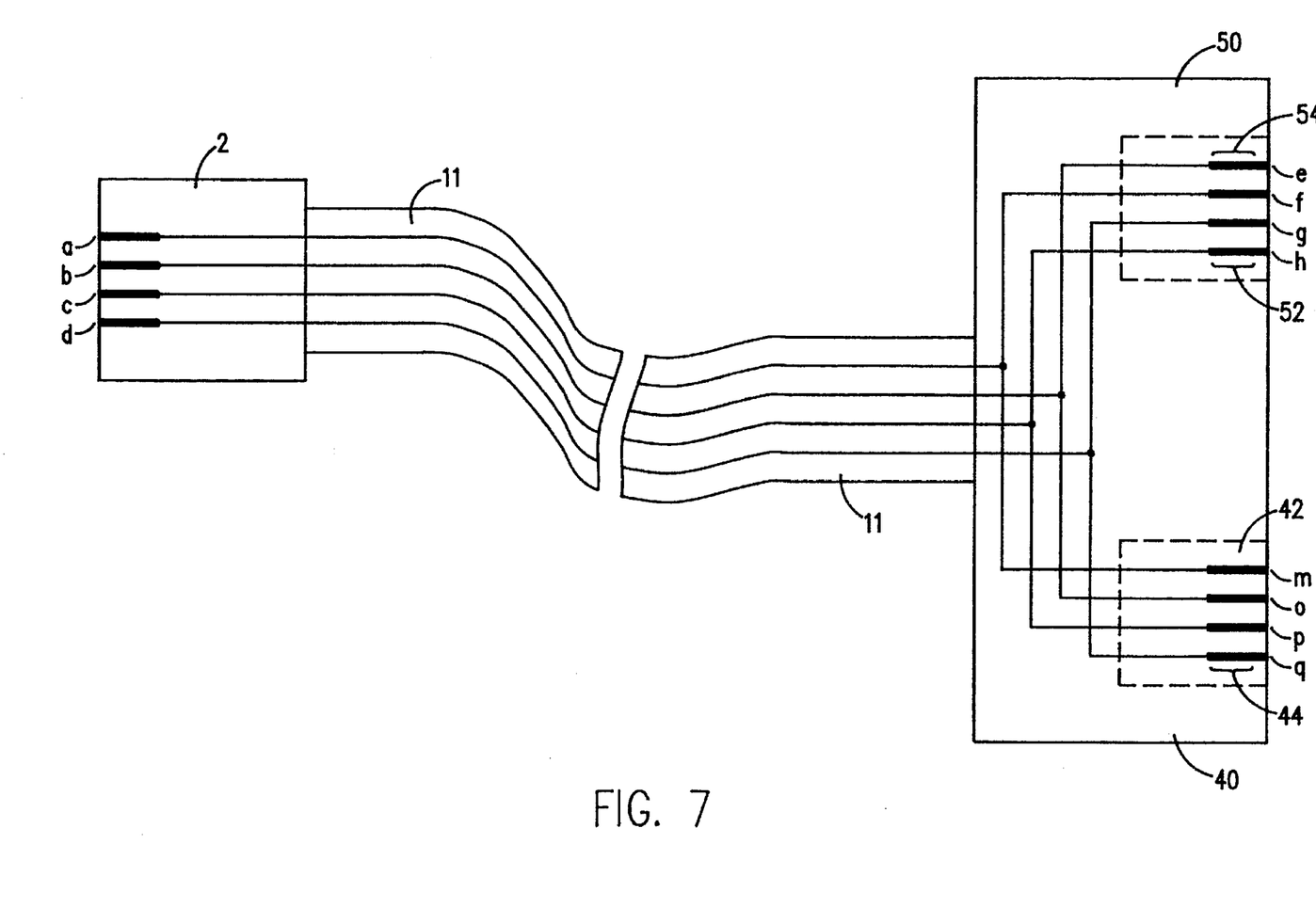
FIG. 7 illustrates the pin connection in a one-to-two telephone extension cable.

FIG. 7 illustrates the pin connection in the one-to-two telephone extension cable, according to the present invention, which is functionally similar to the one-to-two adapter of FIG. 5 except that the connecting body 10 on the one-to-one adapter is replaced by a telephone cable 11 comprising four wires. The pin connection is identical to that in the one-to-two adapter as shown in FIG. 5.

Figure 8:
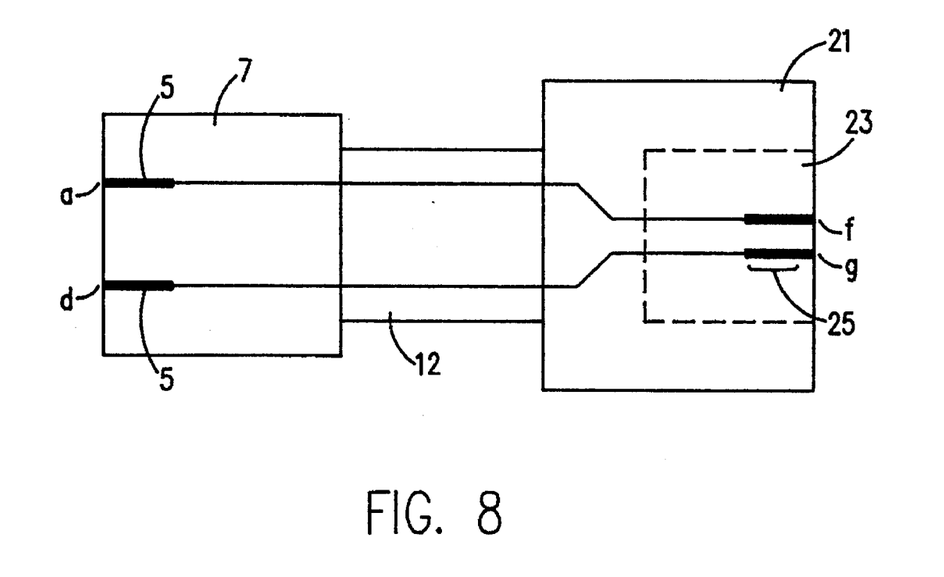
FIG. 8 illustrates the pin connection in another embodiment of the one-to-one telephone jack adapter.

FIG. 8 illustrates the pin connection in another embodiment of the one-to-one adapter wherein the plug and the receptacle each has only two pins for carrying the signals of one telephone line. As shown, the plug 7 comprises two pins 5, labeled by (a,d) which match the two outer pin positions of a regular 4-pin telephone jack. The receptacle 21 comprises two pins 25 in the opening 23. The pins 25, labeled by (f,g), match the two inner pin positions of a regular telephone cable plug. Numeral 12 denotes a connecting body comprising two wires for electrically connecting the pins 5 to the pins 25.

Figure 9:
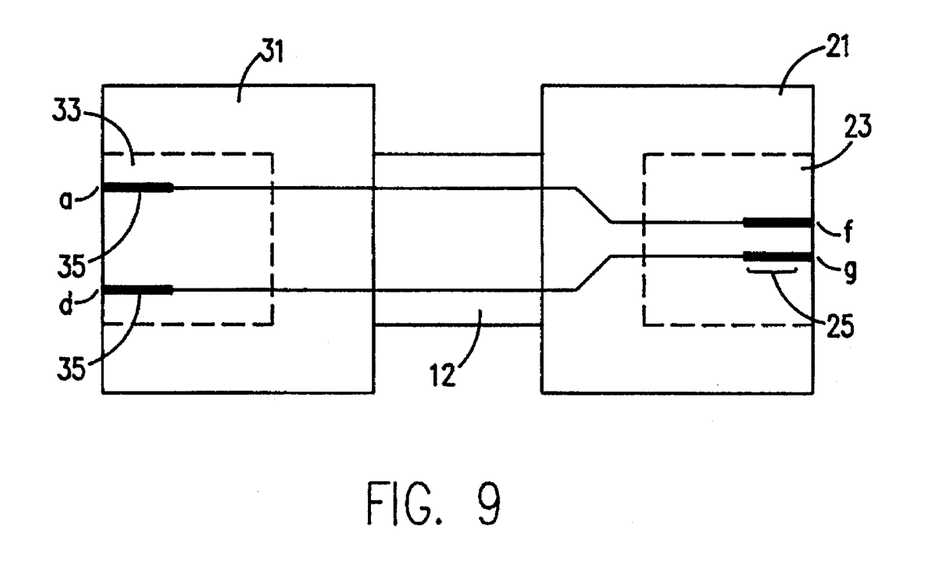
FIG. 9 illustrates the pin connection in another embodiment of the one-to-one telephone cable coupler.

FIG. 9 illustrates the pin connection in another embodiment of the one-to-one coupler wherein each of receptacles has only two pins for carrying the signals of one telephone line. The interconnection of pins is identical to that of the one-to-one adapter of FIG. 8. As shown, the pins 35 in the opening 33 of receptacle 31 are electrically connected to the pins 25 in the receptacle 21.

Figure 10:
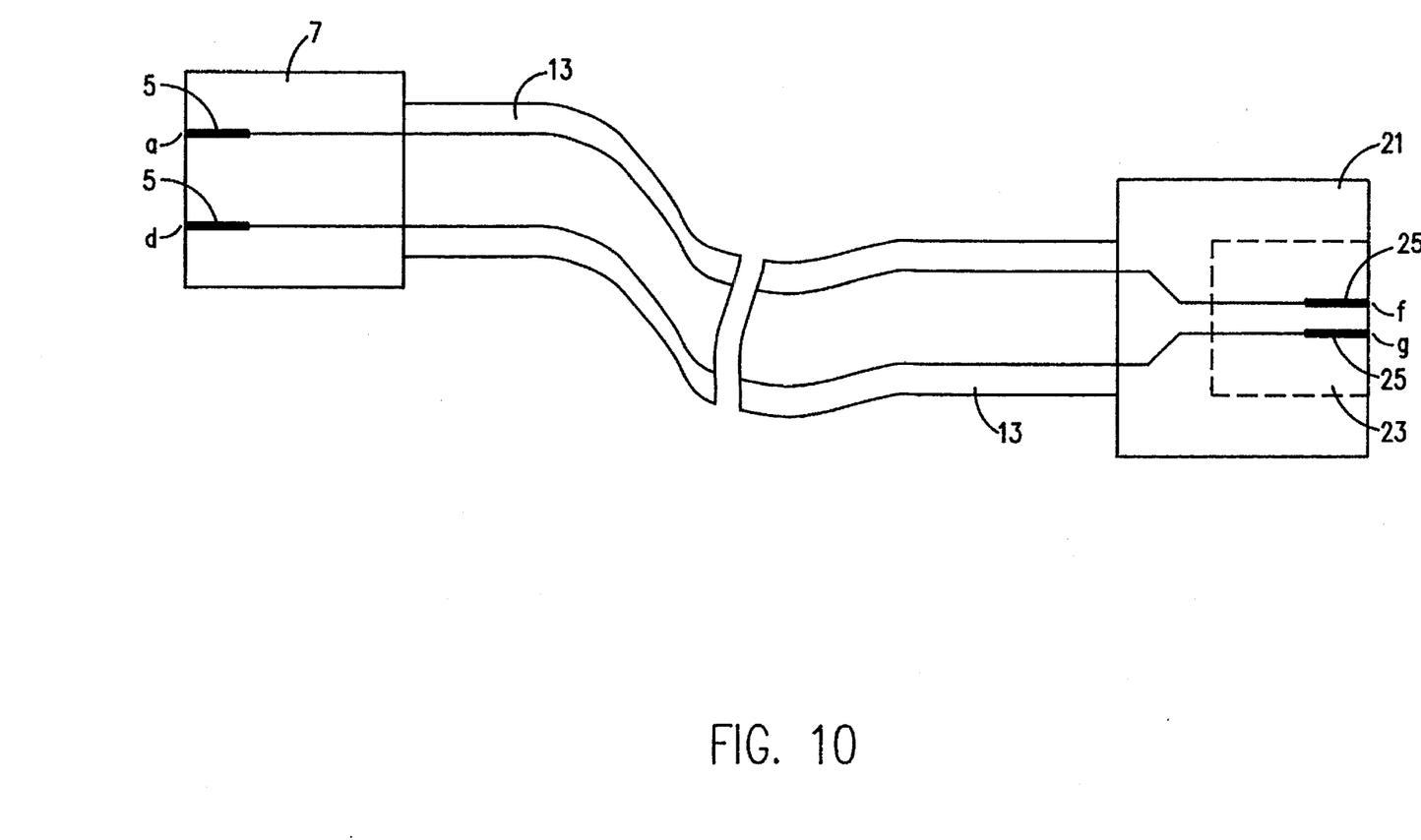
FIG. 10 illustrates the pin connection in another embodiment of the one-to-one telephone extension cable.

FIG. 10 illustrates the pin connection in another embodiment of the one-to-one extension cable wherein only two pins are used to carry signals of one telephone line. As shown in FIG. 10, the extension cable is similar the one-to-one adapter of FIG. 8 except that the connecting body 12 of the adapter is replaced by a telephone cable 13 comprising two wires. The pin connection is identical to that illustrated in FIG. 8.

Figure 11:
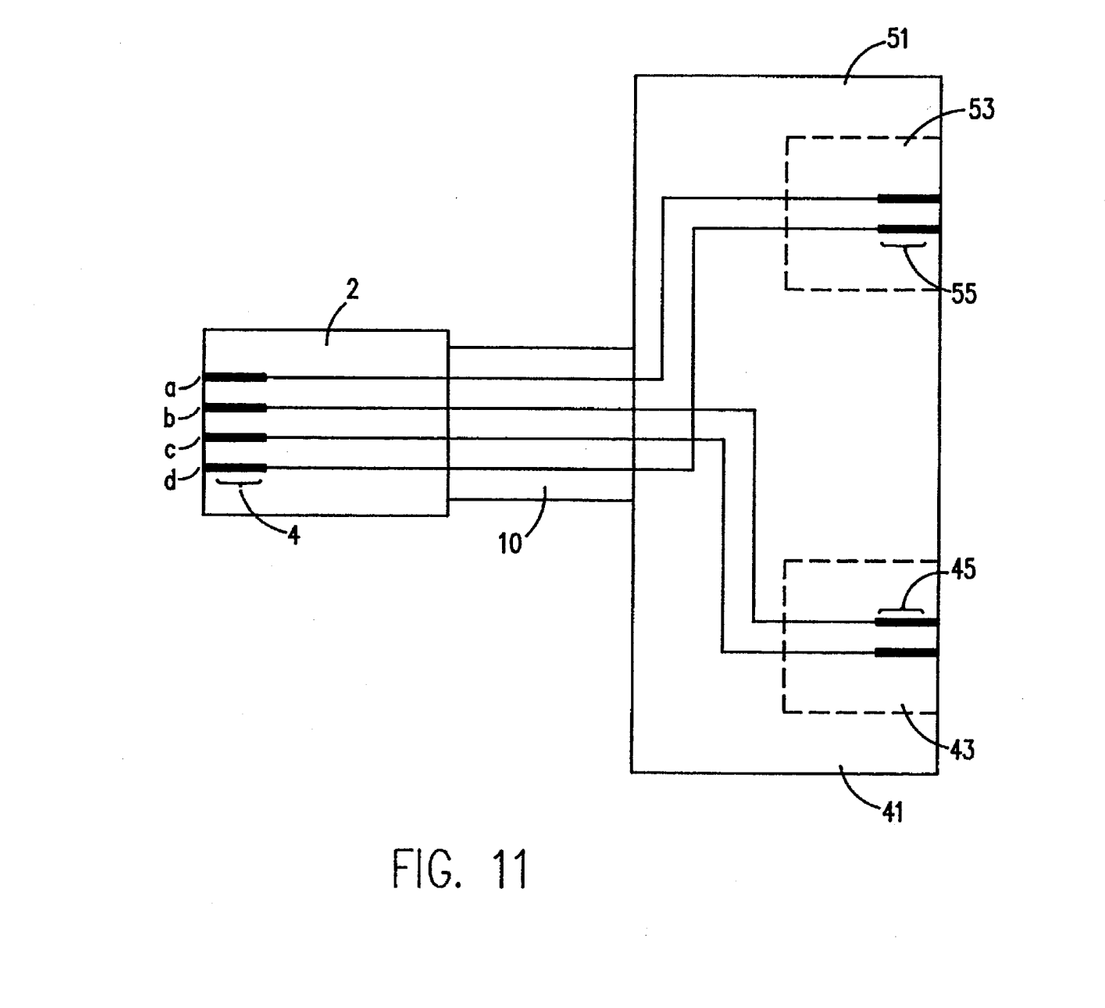
FIG. 11 illustrates the pin connection in another embodiment of the one-to-two telephone jack adapter.

FIG. 11 illustrates the pin connection in another embodiment of the one-to-two adapter wherein each of the receptacles has only two pins while the plug has four pins. As shown in FIG. 11, the four pins 4 on plug 2 are labeled (a,b,c,d), matching the four pin positions of a regular telephone jack. The two pins 45 in the opening 43 of receptacle 41 are connected to the inner pins (b,c) while the two pins 55 in the opening 53 of receptacle 51 are connected to the outer pins (a,d). The pins in receptacles 41 and 51 match the two inner pin positions of a regular telephone cable plug.

Figure 12:
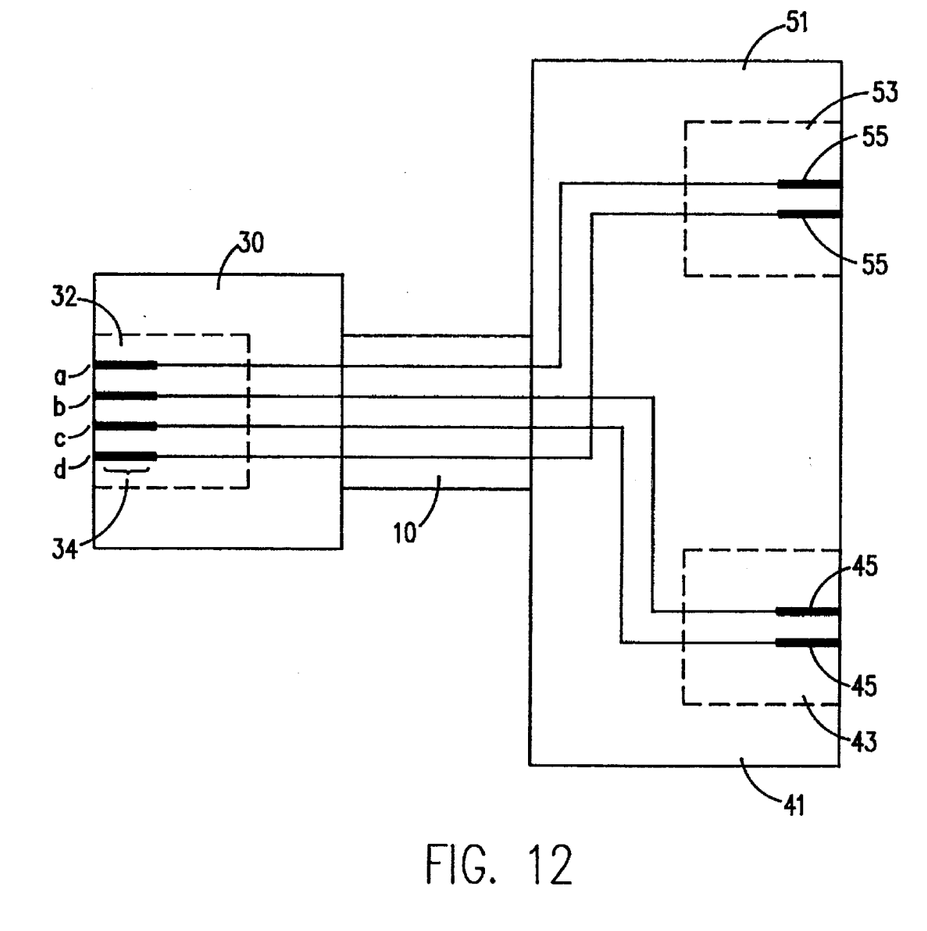
FIG. 12 illustrates the pin connection another embodiment of the one-to-two telephone cable coupler.

FIG. 12 illustrates the pin connection in another embodiment of the one-to-two coupler wherein two of the receptacles each has only two pins while the third receptacle has four pins. As shown in FIG. 12, the one-to-two coupler is similar to the one-to-two adapter of FIG. 11 except that the plug 2 is replaced by a receptacle 30. The pin connection in the one-to-two coupler of FIG. 12 is identical to that in the one-to-two adapter of FIG. 11.

Figure 13:
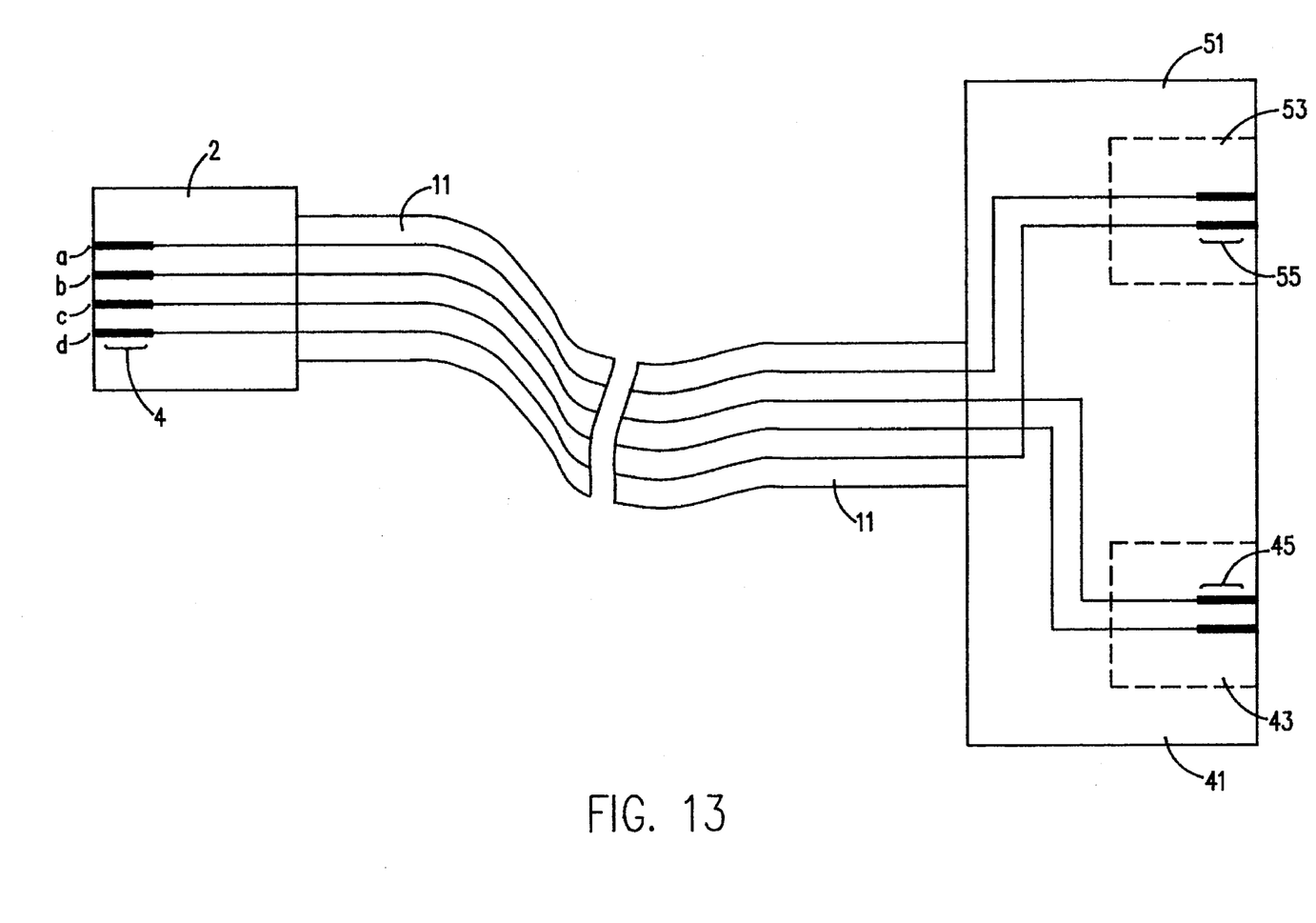
FIG. 13 illustrates the pin connection in another embodiment of the one-to-two telephone extension cable.

FIG. 13 illustrates the pin connection in another embodiment of the one-to-two extension cable wherein two of the receptacles each has only two pins while the plug has four pins. The one-to-two extension cable of FIG. 13 is similar to the one-to-two adapter of FIG. 11 except that the connecting body 10 in the one-to-two adapter is replaced by a telephone cable 11 comprising four wires.

The present invention is disclosed according to the embodiments shown in FIG. 1 to FIG. 13. It is obvious to those skilled in the art that many modifications, additions, and deletions can be made therein without departing from the spirit and scope of the invention as set forth in the appended claims.

What is claimed is:

1. In a dual-line telephone system using connectors each comprising 4 pin positions arranged in a row for seating electrical contacts wherein the two inner pin positions are used for connecting line 1 while the two outer pin positions are used for connecting line 2, an adapter comprising:

a first plug having two first pins positioned to match the two outer pin positions of a 4-pin telephone jack; and a first receptacle having two first pins positioned to match the two inner pin positions of a 4-pin telephone plug;

wherein the first pins in said first plug are separately and electrically connected to the first pins in said first receptacle so as to connect line 2 of said telephone jack to line 1 of said telephone plug.

2. The adapter of claim 1 further comprising a cable having a plurality of wires to provide electrical connections from said first plug to said first receptacle.

3. The adapter of claim 1 wherein:

said first plug further comprises two second pins positioned to match the two inner pin positions of said 4-pin telephone jack;

said first receptacle further comprises two second pins positioned to match the two outer pin positions of said 4-pin telephone plug; and the second pins in said first plug are separately and electrically connected to the second pins in said first receptacle so as to connect line 1 of said telephone jack to line 2 of said telephone plug.

4. The adapter of claim 3 further comprising a cable having a plurality of wires to provide electrical connections from said first plug to said first receptacle.

5. The adapter of claim 1 wherein said first plug further comprises two second pins positioned to match the inner pin positions of said 4-pin telephone jack; said adapter further comprising a second receptacle having two first pins positioned to match the inner pin positions of another 4-pin telephone jack; wherein the first pins in said second receptacle are separately and electrically connected to the two second pins in said first plug so as to connect line 1 of said telephone jack to line 1 of said another telephone plug.

6. The adapter of claim 5 further comprising a cable having a plurality of wires to provide electrical connections from said first plug to said first receptacle and said second receptacle.

7. The adapter of claim 1 wherein said first plug further having two second pins positioned to match the inner pins of said 4-pin telephone jack; said adapter further comprising a second receptacle having four pins positioned to match the corresponding pin positions of another 4-pin telephone plug; wherein the first and second pins in said first plug are separately and electrically connected to the corresponding pins in said second receptacle so as to connect line 1 and line 2 of said telephone jack to the respective lines of said another telephone plug.

8. The adapter of claim 7 further comprising a cable comprising a plurality of wires to provide electrical connections from said first plug to said first and second receptacles.

9. In a dual-line telephone system using connectors each having 4 pin positions arranged in a row for seating electrical contacts wherein the two inner pin positions are used for connecting line 1 while the two outer pin positions are used for connecting line 2, a coupler comprising:

a first receptacle having two first pins positioned to match the two outer pin positions of a first 4-pin telephone cable plug; and a second receptacle having two first pins positioned to match the two inner pin positions of a second 4-pin telephone cable plug;

wherein the first pins in said first receptacle are separately and electrically connected to the first pins in said second receptacle so as to connect line 2 of said first cable plug to line 1 of said second cable plug.

10. The coupler of claim 9 further comprising a cable having a plurality of wires to provide electrical connections from said first receptacle to said second receptacle.

11. The coupler of claim 9 wherein:

said first receptacle further comprises two second pins positioned to match the inner pin positions of said first 4-pin telephone cable plug; and said second receptacle further comprises two second pins positioned to match the two outer pin positions of said second 4-pin telephone cable plug;

wherein the second pins in said first receptacle are separately and electrically connected to the second pins in said second receptacle so as to connect line 1 of said first cable plug to line 2 of said second cable plug.

12. The coupler of claim 11 further comprising a cable having a plurality of wires to provide electrical connections from said first receptacle to said second receptacle.

13. The coupler of claim 9 wherein said first receptacle further comprises two second pins positioned to match the inner pin positions of said first 4-pin telephone cable plug; said coupler further comprising a third receptacle having two first pins positioned to match the inner pin positions of a third 4-pin telephone cable plug; wherein said second pins in said first receptacle are separately and electrically connected to the first pins in said third receptacle so as to connect line 1 of said first cable plug to line 1 of said third cable plug.

14. The coupler of claim 13 further comprising a cable having a plurality of wires to provide electrical connections from said first receptacle to said second and third receptacles.

15. The coupler of claim 9 wherein said first receptacle further comprises two second pins positioned to match the inner pin positions of said first 4-pin telephone cable plug; said coupler further comprising a third receptacle having four pins positioned to match the corresponding pin positions of a third 4-pin telephone cable plug; wherein the first and second pins in said first receptacle are separately and electrically connected to the corresponding pins of said third receptacle so as to connect line 1 and line 2 of said first cable plug to the respective lines of said third cable plug.

16. The coupler of claim 15 further comprising a cable having a plurality of wires to provide electrical connections from said first receptacle to said second and third receptacles.

* * * * *